Oct. 23, 1956     A. T. PICASCIA     2,767,563
HEAT TRANSFERRING CONTAINER SUPPORT
Filed Nov. 16, 1953

INVENTOR
ALEXANDER T. PICASCIA
BY
ATTORNEYS

United States Patent Office 2,767,563
Patented Oct. 23, 1956

2,767,563
HEAT TRANSFERRING CONTAINER SUPPORT

Alexander T. Picascia, Las Vegas, Nev.

Application November 16, 1953, Serial No. 392,173

1 Claim. (Cl. 62—142)

This invention has to do with heat transfer devices upon which containers of liquids, for instance, may be supported for keeping the contents of the container at or about a given temperature. For instance, when a pitcher of water or milk is placed upon a table for service, the contents of the container become warm after a relatively short while.

It is therefore an object of my present invention to provide a container-supporting device which may contain a suitable coolant, or even a heated liquid, for maintaining the device at a given temperature for a substantial length of time.

Other objects and corresponding advantages will become apparent from the ensuing description, wherein I describe a presently preferred embodiment of my invention, for which purpose I shall refer to the accompanying drawing in which.

Figure 1:
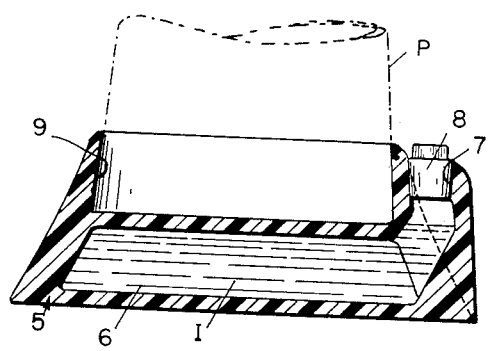
Figure 1 is a medial sectional view of one embodiment of my invention.

I wish it understood, however, that, except as may be indicated by the appended claims, wherein I define what I believe that I have invented, I do not limit my invention to the details illustrated in the drawing and now to be described.

Figure 2:
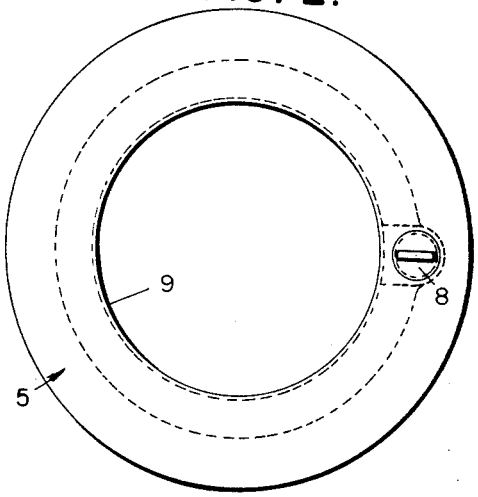
Figure 2 is a top plan view.

Referring now to the drawings, Figures 1 and 2, the numeral 5 denotes a base which it is my preference to make of a suitable plastic having satisfactory heat transfer characteristics. The base has a compartment 6 adapted to receive a suitable coolant such as ice, the compartment having a filling opening 7 at one side, closed by a removable plug 8.

In the top of the base, there is an upwardly opening cavity 9 shaped to receive the bottom end of a pitcher or other container P.

In preparing my device for use as a supporting base for a container, I first fill the compartment 6 with water and then place the device in the freezing compartment of a conventional refrigerator until the water in the compartment becomes frozen into ice I. The device is then ready for use as a base for the container.

Figure 3:
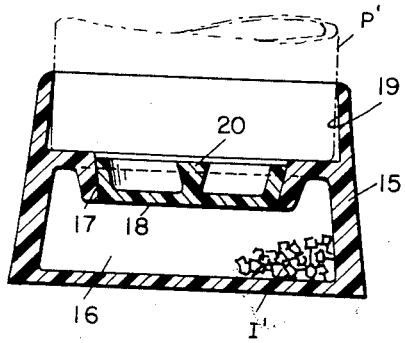
Figure 3 is a medial sectional view showing a modified form of my invention.

In Figure 3, I show a modification wherein the base 15, having the ice compartment 16, and an upwardly opening cavity 19 in its top to receive the bottom end portion of a container P'; also has a tapered filling opening 17 through the bottom of the cavity 19 to receive a closure plug 18. The closure plug has a central transverse rib 20 which serves as a handle to grasp when inserting and removing the plug. The closure plug is also tapered to conform to the opening 17 so that it may have a wedge fit therein to serve as an effective seal. In this form of my invention, the opening 17 is large enough to place cracked ice directly into the compartment 16 without having to first fill the compartment with water and then freeze the water.

Figure 4:
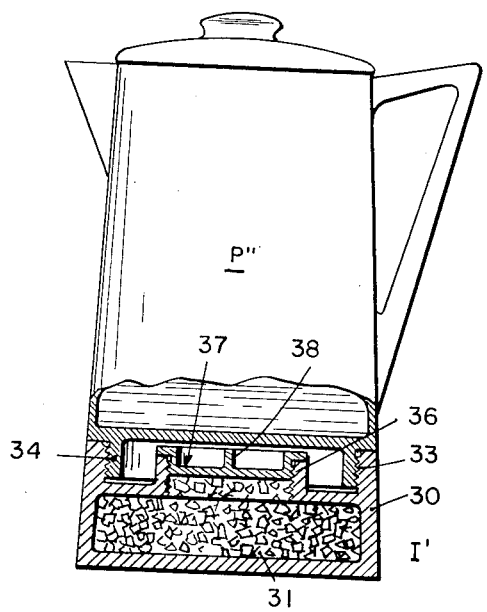
Figure 4 is a view partly in section and partly in side elevation showing a further modified form of my invention.

In Figure 4, I show a further modification, comprising a base 30 having a coolant compartment 31 adapted to receive a coolant such as cracked ice I'. In the top of the base, there is an annular, internally threaded cavity 33 which threadedly receives the threaded annular flange 34 depending from the bottom of the container P", so as to firmly secure the container to the base in such a manner that the base 30 becomes in effect an integral part of the container. In order to render the compartment 31 accessible for filling and emptying, the base is provided with an internally threaded annular flange 36 which threadedly receives a closure plug 37 having a central transverse rib 38 which functions as a handle.

Figure 5:
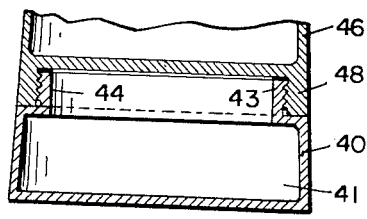
Figure 5 is a sectional view showing another modified form of my invention.

In Figure 5, I show another modification of my invention wherein the base 40 has a coolant compartment 41 and has an externally threaded annular neck 43 which defines an access opening 44. The container 46 has an internally threaded, depending annular flange 48, whose threads engage the threads on the neck 43 to effect a seal therewith so that the container itself forms a closure for the opening 44.

It will be apparent that I have provided a highly useful device which may be economically made and used wherever it is desired to maintain liquids at a given temperature for a substantial length of time. Also it will be apparent that my device may be used for heating purposes by substituting a heated liquid for the ice in the compartment which I have described as being provided for the reception of a coolant.

Also it is apparent that my device may be made of various suitable materials such as plastics, glass, rubber or metal.

I claim:

In a device of the character described, a liquid receptacle having a bottom heat-transfer wall presenting an exteriorly threaded depending annular flange, and an ice receptacle disposed beneath said liquid receptacle in supporting relationship thereto, said ice receptacle having a top wall presenting a centrally located filling opening and a pair of upright, radially spaced flanges the outer one of which is annular and is internally threaded to threadedly receive said flange of said liquid receptacle and the inner one of which surrounds said filling opening, and a closure cap carried by said inner flange in closing relationship to said filling opening; said flanges presented by said top wall defining therebetween an annular air chamber between the said top wall of said ice receptacle and the said bottom wall of said liquid receptacle.

References Cited in the file of this patent
UNITED STATES PATENTS

| | | |
|---|---|---|
| 71,899 | Murden et al. | Dec. 10, 1867 |
| 1,131,338 | De Forrest | Mar. 9, 1915 |
| 1,785,438 | Edlin | Dec. 16, 1930 |
| 1,835,463 | Campbell | Dec. 8, 1931 |
| 1,950,714 | D'Aoust | Mar. 13, 1934 |
| 2,485,922 | Rubin | Oct. 25, 1949 |
| 2,645,375 | Topfer | July 14, 1953 |
| 2,713,779 | Fitzgibbons | July 26, 1955 |

FOREIGN PATENTS

| | | |
|---|---|---|
| 254,514 | Switzerland | Dec. 16, 1948 |